March 2, 1954  J. HALTENBERGER  2,670,613
EXPANSION COOLING

Filed Aug. 20, 1952  2 Sheets-Sheet 1

INVENTOR
Julius Haltenberger

March 2, 1954  J. HALTENBERGER  2,670,613
EXPANSION COOLING
Filed Aug. 20, 1952  2 Sheets-Sheet 2
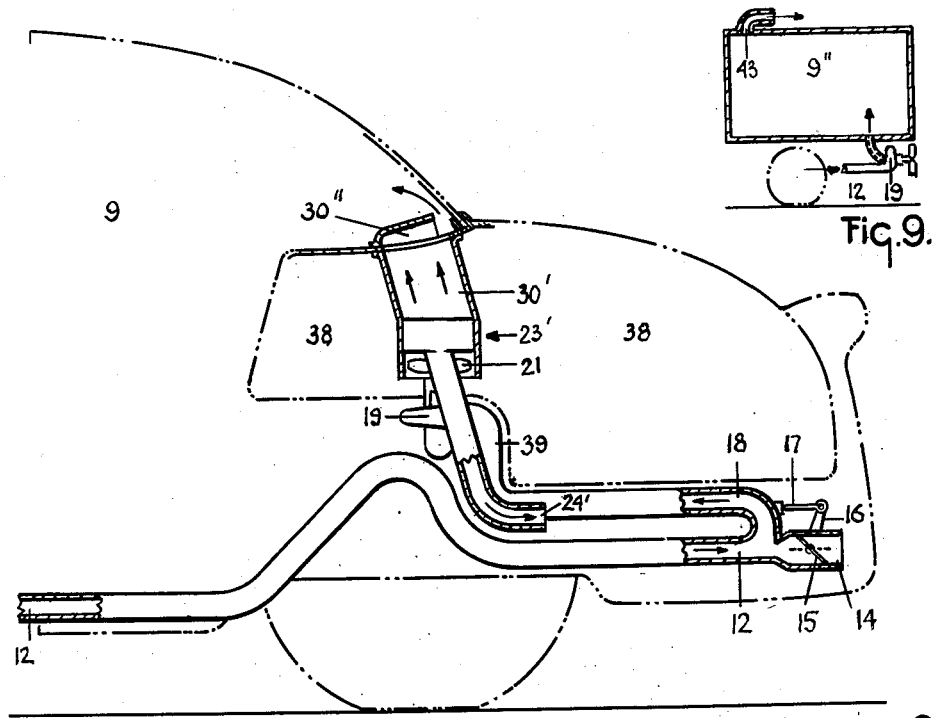
Fig.9.
Fig.6.
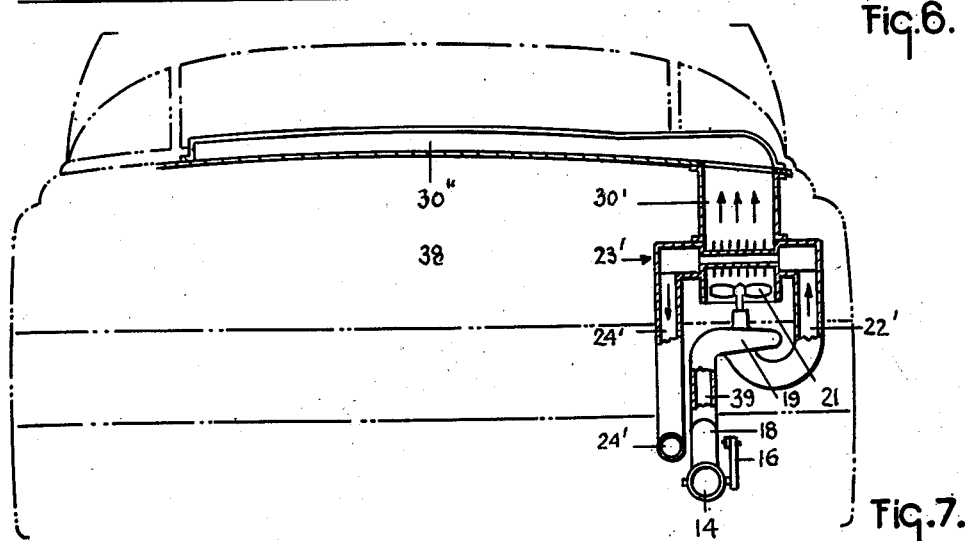
Fig.7.
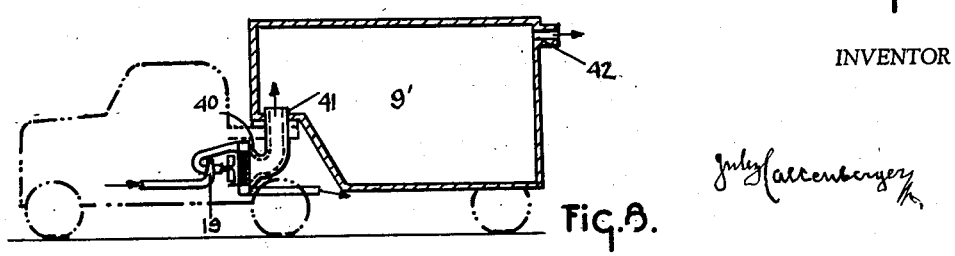
Fig.8.
INVENTOR
July Haltenberger

Patented Mar. 2, 1954

2,670,613

UNITED STATES PATENT OFFICE 2,670,613

EXPANSION COOLING

Jules Haltenberger, Rancho Santa Fe, Calif.

Application August 20, 1952, Serial No. 305,451

5 Claims. (Cl. 62—136)

My invention relates to expansion turbine cooling of the interior of a vehicle body.

It is here proposed and is the object of my invention to provide for a vehicle a gaseous fluid source under pressure arranged to drive an expansion turbine which cools the fluid by extraction of heat represented in work done by the fluid when driving an operative part like a fan, and use the heat extracted fluid directly or through intermediate means to cool the interior of a vehicle body.

Further objects will appear as the description proceeds.

Figure 1:
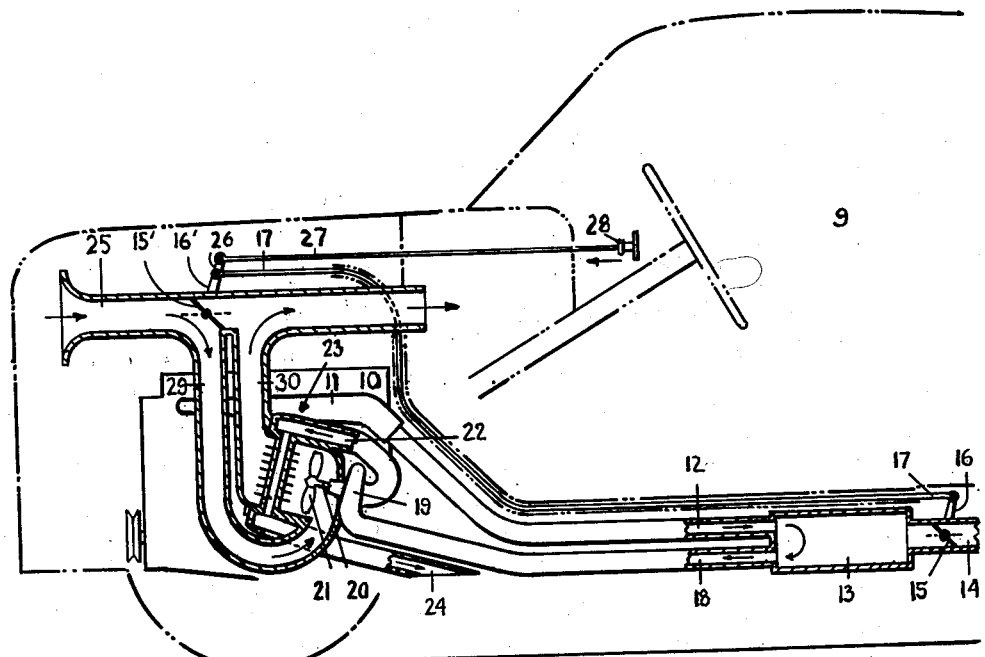
Figure 5:
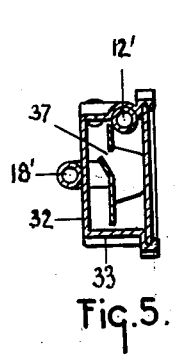
Figures 2, 3:
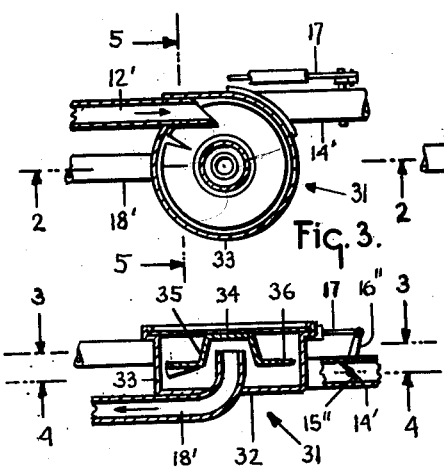
Figure 4:
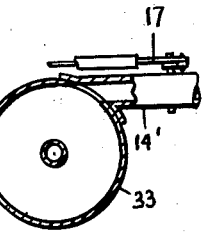

Referring to the drawings, Fig. 1 is a schematical presentation of my invention applied to an internal combustion engine of a motor vehicle; Fig. 2 is a section substantially on line 2—2 of Fig. 3 of an exhaust gas cleaner; Fig. 3 is a section substantially on line 3—3 of Fig. 2; Fig. 4 is a section substantially on line 4—4 of Fig. 2; Fig. 5 is a section substantially on line 5—5 of Fig. 3; Fig. 6 is a modification of my invention schematically presenting my invention when disposed in the rear luggage space of a motor vehicle; Fig. 7 is a schematical rear elevation of Fig. 6; Fig. 8 illustrates the application of the invention for a trailer, shown in a smaller scale; Fig. 9 is a further modificatiton of the invention.

Referring to Fig. 1, which for simplicity of presentation is completely schematical, it will be seen that a usual motor vehicle fore part shown in chain lines forms a body interior space 9. This vehicle is propelled by a usual internal combustion engine 10, from which the exhaust gases are collected in a usual exhaust manifold 11 and the gas through exhaust pipe 12 reaches the muffler or silencer 13 in the usual well-known manner. The muffler is provided with a tail pipe 14 for the normal escape of the exhaust gas, here however, the tail pipe is provided with a butterfly valve blade 15 shown in pipe closing position (dots show open position) arranged to be operated by lever 16, and controlled by Bowden wire 17 (to be described).

As shown in the drawing, the tail pipe gas exit being closed, the gas flows into return pipe 18, and through the forward end thereof into a housing 19 containing a usual expansion turbine. This turbine has an operating shaft 20 forwardly terminating in a cooling fan 21 the shaft is arranged to drive.

The exhaust gas leaves the engine 10 hot and it is progressively cooled in the ambient air cooled exhaust pipe, expanded and cooled in the muffler further cooled in the ambient air cooled return pipe and when further expanded in the expansion turbine as the energy is absorbed by the cooling fan, leaves the turbine housing cooled. This cold exhaust gas through a header provided pipe 22 is guided to flow through crosswise and cool the usual lengthwise passages in a usual heat exchanger generally at 23 and leaves through a header provided pipe 24 for final escape into the atmosphere.

All the automobiles of which applicant is aware, provide a fresh air duct 25 taking air from the fore part of the automobile and while the automobile is in motion through ram pressure, supplying ambient air to the body interior. Here however, the duct is provided with a butterfly valve 15' arranged to be operated by usual lever 16'. This lever has an extension 26 and terminates in an operating connection with control rod 27, at the inner end of this rod an operating handle 28 is provided and disposed conveniently to the driver of the automobile.

The fresh air duct butterfly valve and the tail pipe butterfly valve are operatively interconnected by a Bowden wire 17 to perform in unison. In Fig. 1 both valves are shown in closed position (the duct valve open position is indicated by dotted lines).

The fresh air duct, to the fore of the closed valve, is provided with a duct 29 formed to guide the fresh air to the rear of the lengthwise passages in the heat exchanger and the fresh air passing through these passages is cooled by indirect contact with the cold exhaust. The expansion turbine driven fan 21 dissipates its energy by force circulating the cooled fresh air, sucking the air through duct 29, and driving it through the heat exchanger passages and thereafter through upstanding duct 30 and the rear half of fresh air duct into the body space.

It will be noted that the driver of the automobile can control the cooling air volume entering into the body by pushing the control handle forwardly thereby controlling the positions of butterflies in unison. With both butterflies in open position the air cooling ceases to operate. Whereas applicant in this schematical presentation illustrates a manual control, this same control could be arranged to respond to a thermostat.

Applicant here presents a simple motor vehicle space cooler. Expansion turbines are now manufactured having the diameter of a half dollar piece and with the attached fan weighing only ounces. The small size and weight in performance is complemented by very high revolutions.

For simplicity, the exchanger here is shown in association with the usual fresh air duct, the exchanger and expansion turbine is equally applicable at the rear end of the vehicle and to save ducting length, the cold air can be sent into the body just in front of the rear window.

Figs. 2, 3, 4 and 5, illustrate in a somewhat larger scale parts duplicates of Fig. 1 which have the same indication numerals with an added prime.

As presented in this drawing, the exhaust gas through exhaust pipe 12' enters tangentially into an expansion and exhaust gas cleaning pot generally at 31. This pot is formed of a circular bottom wall 32, tubular wall 33 and cover 34. To the cover as by spot welding is secured a depending cone 35 having a flared disc 36 of somewhat smaller diameter than the inside diameter of the tubular wall, this cone and disc substantially divide the pot into an upper and a lower chamber. As patentably clear from Fig. 5, a small segment of the disc is bent downwardly to form a shaving disc gap 37. The bottom of the pot supports a gas return pipe 18' arranged to take the gas at high level from under the cone, and the lower chamber provides a tangential tail pipe 14', having a butterfly valve 15'', here shown in closed position, and operated by lever 16'' and controlled by Bowden wire 17, respectively.

In operation, the gas enters the pot expansion and cools, the tangential entry spins the gas around the upper chamber, the centrifugal force drives the exhaust gas coal tar residue on the inside of the wall; this residue by gravity descends to the lower chamber through the narrow space at the outside diameter of the disc. Gravity also deposits heavier residues on the top of the disc. In the spinning these residues they are shaved off by the edge of the disc gap and taken by the gas flowing through the gap to the lower chamber where spinning continues. When the tail pipe is closed, the cleaned and partially cooled gas flows through the return pipe to the expansion turbine. When the butterfly valve is moved to the open position, the gas escapes through the tail pipe.

When it is desired to mount the body interior cooling on the rear end of the vehicle, this is illustrated in Figs. 6 and 7. The chain lines indicate the rear end of a usual automobile having a body interior 9 and a luggage compartment 38. The usual exhaust pipe 12 is provided with a butterfly valve 15, here shown in closed position, dots indicate the open position, it is operated by the driver of the vehicle as described in connection with Fig. 1. When this valve is closed the gas is compelled to flow into the return pipe 18 where gas pressure is built up. This pipe has an upstanding continuation 39 arranged to guide the exhaust gas into an expansion turbine in housing 19 having a fan 21 driven by the turbine. This fan dissipates the work of the turbine and thereby extracts the heat from the gas. The heat extracted gas leaves the turbine by pipe 22' and enters in a heat exchanger shown generally at 23', cooling the same and escapes from the opposite end of the heat exchanger by pipe 24' into the atmosphere. The work dissipating fan drives the luggage compartment air through the heat exchanger where it becomes cold and through duct 30' into a vehicle crosswise distributing duct 30'', and is arranged to leave the duct through a long gap adjacent to the usual rear window where it removes any vapor or dew deposit on the window and reaches the body interior 9.

This body interior cooling is light and simple and hardly reduces the luggage compartment useful space. In operation, the driver of the vehicle needs only to operate the position of the butterfly valve to create body interior cooling or when adjusting the valve to open position the cooling system ceases to operate.

There is a great demand for cooling the interior of the usual inter-state trailer trucks to preserve perishable goods. An inexpensive and light trailer interior cooling is schematically illustrated in Fig. 8 where all the elements shown and described in connection with Figs. 6 and 7 are incorporated with the addition of a cold air collector cone 40 and upstanding pipe 41 disposed at the fulcrum where the two vehicles are operatively interconnected. The cold air cools the body interior 9' and after its mission escapes through pipe 42 into the atmosphere.

For certain applications a further simplification of body interior cooling is arrived at by guiding the heat extracted exhaust gas directly into a body interior, this is schematically shown in Fig. 9, here the body interior 9'' is sealed all around leaving only a gas escape pipe 43. Excepting the intercooler and associate ducts the elements were described in connection with Figs. 1, 6 and 7.

While I have herein shown and described only certain specific embodiments of my invention, and have suggested only certain possible modifications, it will be appreciated that many changes and variations can be made to suit particular conditions and embodiments of use, without departing from the spirit and scope of my invention.

What applicant claims as his invention:

1. In a motor vehicle having a body and a motivating internal combustion engine, a body interior cooler, comprising an engine created source of compressed exhaust gas, an expansion turbine driven by the gas, a turbine work dissipating and gas heat extracting fan integral with said turbine, and ambient air heat exchanger means to cool the interior of said body.

2. In a motor vehicle having a body and a motivating internal combustion engine, a body interior cooler, comprising an engine created source of compressed exhaust gas, an expansion turbine driven by the gas, turbine work dissipating and gas heat extracting means driven by said turbine, and ambient air heat exchanger means to cool the interior of said body.

3. In a motor vehicle having an associated trailer with a body and a motivating internal combustion engine, a body interior cooler, comprising an engine created source of compressed exhaust gas, an expansion turbine driven by the gas, turbine work dissipating and gas heat extracting means driven by said turbine and means to admit the heat extracted gas into said body.

4. In a motor vehicle having a body and a motivating internal combustion engine, a body interior cooler comprising, an engine created source of compressed exhaust gas, an expansion turbine driven by the gas, turbine work dissipating and gas heat extracting fan driven by said turbine, a heat exchanger in association with said fan wherein the fan forces ambient air through the heat exchanger into the body interior.

5. A motor vehicle and an associated trailer having a body, a body interior cooler comprising, an internal combustion engine created compressed exhaust gas source in said vehicle, an expansion turbine driven by the gas, turbine work dissipating and gas heat extracting fan driven by said turbine, a heat exchanger in association with said fan wherein the fan forces ambient air through the heat exchanger into the trailer body.

JULES HALTENBERGER.

References Cited in the file of this patent

UNITED STATES PATENTS

| Number | Name | Date |
|---|---|---|
| 2,484,851 | Paget | Oct. 18, 1949 |
| 2,618,470 | Brown | Nov. 18, 1952 |